US011534987B2

(12) United States Patent
Escowitz et al.

(10) Patent No.: US 11,534,987 B2
(45) Date of Patent: Dec. 27, 2022

(54) METHOD FOR IN-SITU DIFFERENTIAL MELTING OF POLYMERS AND PARTS FORMED THEREFROM

(71) Applicant: Arris Composites Inc., Berkeley, CA (US)

(72) Inventors: Ethan Escowitz, Berkeley, CA (US); J. Scott Perkins, Oakland, CA (US); Erick Davidson, Piedmont, CA (US); Riley Reese, Carpinteria, CA (US); Andrew Mathews, Berkeley, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 16/800,491

(22) Filed: Feb. 25, 2020

(65) Prior Publication Data

US 2020/0269527 A1    Aug. 27, 2020

Related U.S. Application Data

(60) Provisional application No. 62/935,357, filed on Nov. 14, 2019, provisional application No. 62/809,982, filed on Feb. 25, 2019.

(51) Int. Cl.
*B29C 70/34* (2006.01)
*B29C 70/68* (2006.01)
*B29K 101/12* (2006.01)

(52) U.S. Cl.
CPC .............. *B29C 70/34* (2013.01); *B29C 70/68* (2013.01); *B29K 2101/12* (2013.01)

(58) Field of Classification Search
CPC ................................ B29C 70/34; B29C 70/68
See application file for complete search history.

(56) References Cited

U.S. PATENT DOCUMENTS 3,686,146 A * 8/1972 Goto ...................... C08G 18/42
528/66
5,066,536 A * 11/1991 Cogswell ........... B29C 66/73115
428/216

OTHER PUBLICATIONS

Bigg, D.M. and J.R. Preston, Stamping of Thermoplastic Matrix Composites, Polymer Composites, vol. 10, No. 4 (Aug. 1989), pp. 261-268. (Year: 1989).*

* cited by examiner

*Primary Examiner* — Matthew J Daniels
(74) *Attorney, Agent, or Firm* — Kaplan Breyer Schwarz, LLP

(57) ABSTRACT

A method for forming a composite part involves forming a layup comprising (a) preforms/flat form-factor feedstock, either of which includes a plurality of fibers and a matrix precursor, and (b) a differential-melt polymer. The matrix precursor and the differential-melt polymer differ as to at least one of thermal properties and rheological properties. The layup is subjected to controlled application of heat and pressure to melt the matrix precursor and differential-melt polymer. The polymers are then cooled to form a composite part that displays properties attributable to all the constituents. As a function of a variety of factors, the resulting part can be homogenous or heterogeneous, and the properties can be localized or global throughout the part.

11 Claims, 9 Drawing Sheets

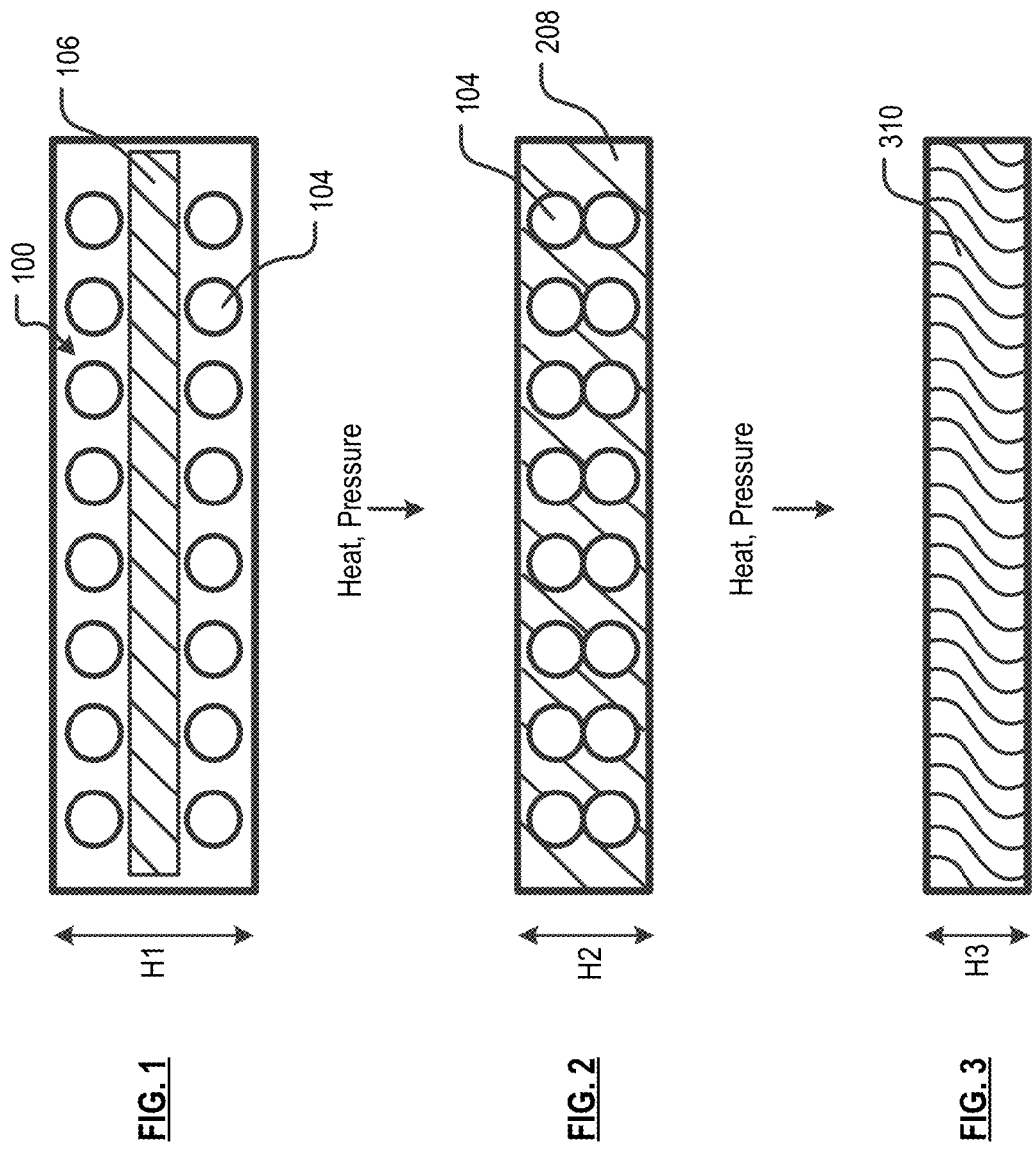

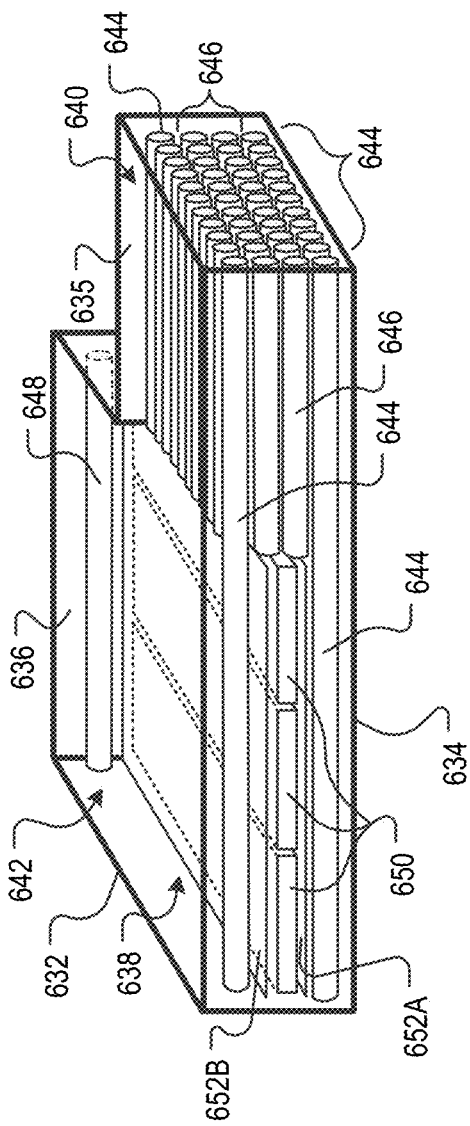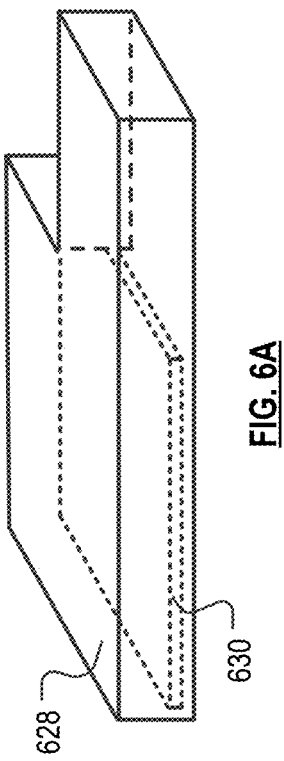
FIG. 6B
FIG. 6A

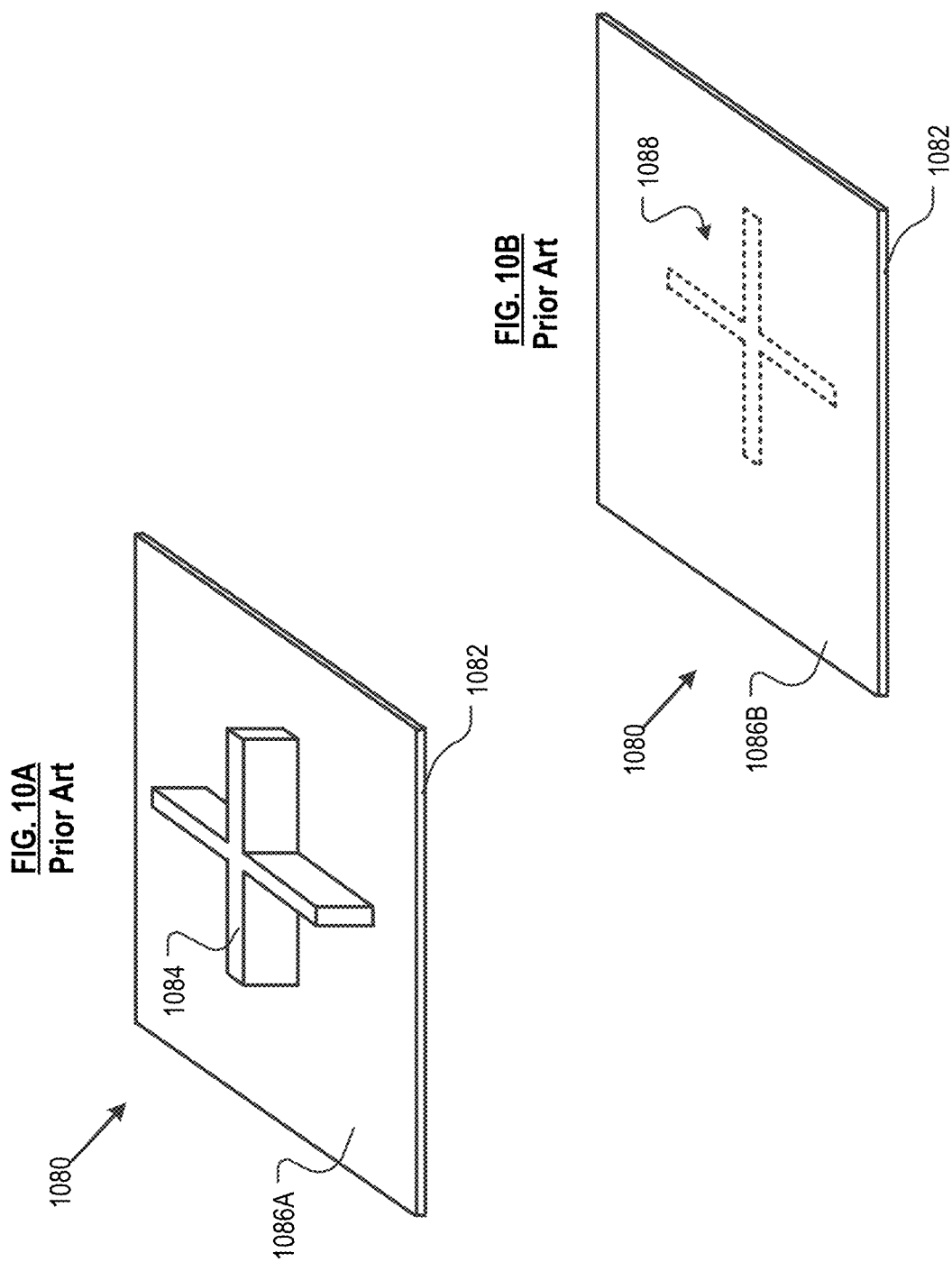

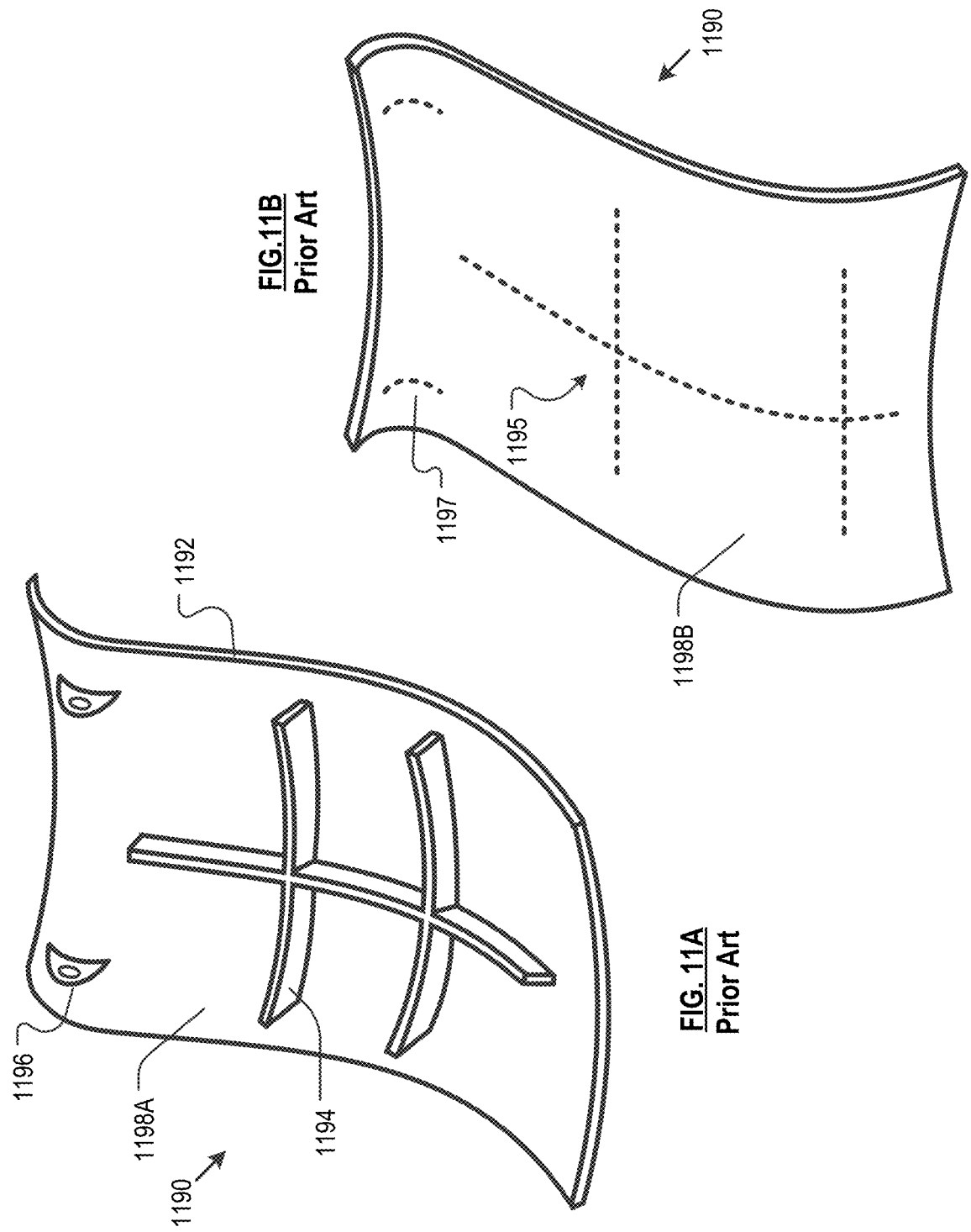

METHOD FOR IN-SITU DIFFERENTIAL MELTING OF POLYMERS AND PARTS FORMED THEREFROM

STATEMENT OF RELATED CASES

This case claims priority of U.S. Pat. App. No. 62/809,982 filed Feb. 25, 2019, and U.S. Pat. App. No. 62/935,357 filed Nov. 14, 2019, both of which are incorporated herein by reference.

FIELD OF THE INVENTION

The present invention relates to fiber-composite materials.

BACKGROUND

A key aspect of composite materials is the interplay between the associated constituents; typically, a matrix material and a fibrous material. The matrix, which is formed from a polymer resin, surrounds and supports the fibrous material (fibers) by maintaining their relative positions and preventing abrasion and environmental attack of the fibers. The combination is synergistic; the composite possesses material properties unavailable from the individual constituents, such as a very high strength-to-weight ratio.

Although composites offer highly desirable material properties for many applications, there are certain use cases where they fall short. For example, there are use cases in which a part, or different regions of the part, are required to accommodate different and somewhat mutually exclusive requirements. For example, a bracket within an airplane requires high strength, low weight, and damping properties. The strength satisfies loading requirements, the low weight facilitates fuel economy, and the damping improves the life of the bracket by reducing vibratory fatigue. These are all independent optimization problems with no single solution.

SUMMARY

The present invention provides a way to achieve global or localized tuning of properties within an object ("part") made from composite material. In some embodiments, the part is formed via an existing compression-molding process, thereby enabling a very cost-effective way to tune material properties of a part.

In accordance with the illustrative embodiment of the present invention, a composite part is formed from a layup comprising: a) one or more preforms, or a flat form-factor feedstock, either of which typically includes a plurality of fibers and a polymer ("matrix precursor"), as well as (b) one or more additional "differential-melt polymers." Consequently, a composite part having three (or more) constituents is formed (i.e., fiber, matrix precursor, and differential-melt polymer), wherein the composite part displays properties attributable to all the constituents.

In accordance with the present teachings, the differential-melt polymer can be used to imbue a part with properties that cannot be provided by the matrix precursor. More particularly, the addition of one or more polymers different from that of the matrix precursor enables localized or global performance enhancements within a single part. For example, utilizing the present invention, the airplane bracket mentioned in the Background section can be formed so that, in addition to exhibiting the strength accruing from its main constituents (i.e., the fiber and matrix precursor), the bracket also exhibits vibration isolation at its attachment points for fatigue resistance, and/or decreased density at areas of low stress for weight savings, and/or increased elasticity in a select regions for tuned mechanical compliance. That can be accomplished, for example, using an elastomer as the differential-melt polymer.

In some embodiments, the matrix precursor and the differential-melt polymer have a different melt temperature, such that one of the polymers will melt before the other polymer. For example, in some embodiments, the differential-melt polymer reaches its melt phase before the matrix precursor. In such embodiments, once the differential-melt polymer reaches its melt phase, applied pressure causes the polymer to flow around the composite subunits, which in such embodiments have not yet melted. In some other embodiments, the matrix precursor reaches its melt phase before the differential-melt polymer. In some further embodiments, the matrix precursor and the differential-melt polymer will have very similar melt temperatures.

In some embodiments, the matrix precursor and the differential-melt polymer intermix during the molding process. In some other embodiments, the matrix precursor and the differential-melt polymer do not intermix. Intermixing, or lack thereof, can be controlled by the difference in melt temperature and selective/timed application of pressure.

In some embodiments, even though the differential-melt polymer is regionally confined within the part, the property enhancements it provides are effectively global.

In some embodiments, the present teachings are used to create a constrained layer in a composite part. In some of such embodiments, a viscoelastic layer, as created from the differential-melt polymer, is sandwiched between plies comprising fiber and a matrix precursor, or a second differential-melt polymer. Using such constrained-layer damping (CLD) in a part provides an ability to obtain high loss factors via a relatively thin configuration and with relatively minimal impact on the stiffness of the system. Although the viscoelastic layer is regionally confined, it can have global effects on a part. For example, if the viscoelastic layer is implemented as a layer that covers the full extent of the length and width of part (even though it represents just a small fraction of the thickness of a part), the whole part will benefit from improved damping.

In some embodiments, the present teachings are used to reduce sink marks in a molded part. Sink marks, which are a common problem in compression and injected-molded parts, manifest as slight depressions resembling "dimples" on the surface of a planar portion of a part. During the course of experimentation with differential-melt polymers, as described herein, the inventors discovered that by placing an elastomer (as a differential-melt polymer) at a specific location in a mold, along with the other molding materials (e.g., preforms, etc.), sink marks are substantially reduced or eliminated.

BRIEF DESCRIPTION OF THE DRAWINGS

FIG. 1 depicts a side cross-sectional view of in-situ differential melt layup 100 in accordance with the illustrative embodiment of the present invention.

FIG. 2 depicts a transition state of the melt layup of FIG. 1 after exposure to heat and pressure.

FIG. 3 depicts the complete consolidation of the materials in the layup of FIG. 1 to a final state under continued application of heat and pressure.

FIG. 6A depicts a part having the constrained elastomer layer.

FIG. 6B depicts a portion of layup used for creating the part of FIG. 6A.

FIGS. 10A and 10B depict a second example in the prior art of a molded part that is subject to sink marks.

FIGS. 11A and 11B depict a third example in the prior art of a molded part that is subject to sink marks.

DETAILED DESCRIPTION

Figure 4:
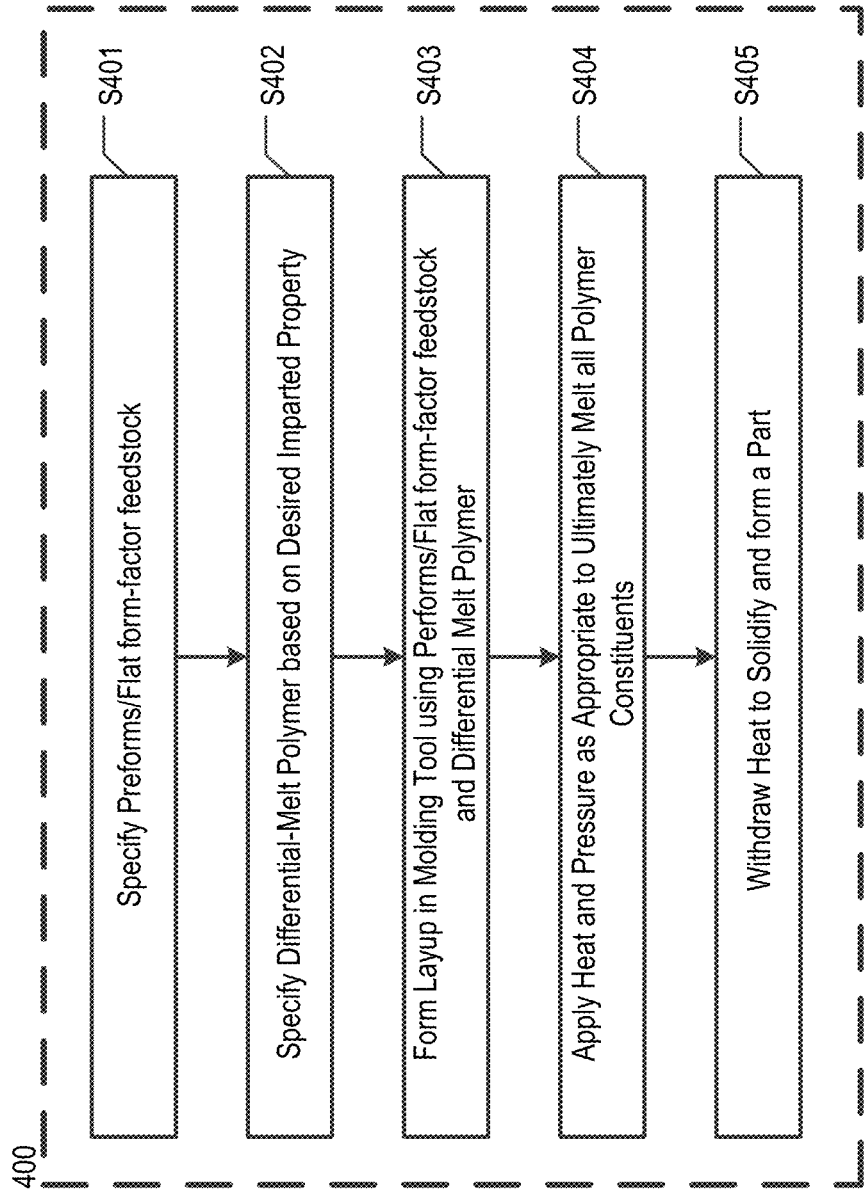
FIG. 4 depicts a method for molding in accordance with the present teachings.

The following terms, and their inflected forms, are defined for use in this disclosure and the appended claims as follows:

"Fiber" means an individual strand of material. A fiber has a length that is much greater than its diameter. For use herein, fibers are classified as (i) continuous or (ii) short. Continuous fibers have a length that is about equal to to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold, plus some additional length to enable "overlap" with other fibers, such as continuous fibers. The term "short fiber," as used herein, is distinct from the "chopped fiber" or "cut fiber," as those terms are typically used in the art. In the context of the present disclosure, short fiber is present in a preform and, as such, will have a defined orientation in the preform, the mold, and the final part. As used generally in the art, chopped or cut fiber has a random orientation in a mold and the final part. Additionally, as used herein, the length of "short fiber" will be based on the length of the smaller features of a mold (they will be comparable in length). In contrast, the length of chopped or cut fiber typically bears no predefined relationship to the length of any feature of a mold/part.

"Continuous" fiber or fiber bundles means fibers/bundles having a length that is about equal to the length of a major feature of a mold in which the fiber/bundles are placed.

"Tow" means a bundle of fibers, and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" or "Prepreg Tow" means a bundle of fibers (i.e., a tow) that is impregnated with resin.

"Preform" means a sized, or sized and shaped portion of tow/tow-preg, wherein the cross section of the fiber bundle has an aspect ratio (width:thickness) of between about 0.25 to about 6. The term preform explicitly excludes sized/shaped (i) tape (which typically has an aspect ratio—cross section, as above—of between about 10 to about 30), (ii) sheets of fiber, and (iii) laminates.

"Flat form-factor feedstock" means at least some of the items excluded from the definition of "preform," including tape, sheets of fiber, and laminates.

"Preform Charge" means an assemblage of preforms that are at least loosely bound together so as to maintain their position relative to one another. Based on preforms, the preform charges can be constructed to have a variety of shapes, and can contain various inserts, passive and/or active.

"About" or "Substantially" means +/−20% with respect to a stated figure or nominal value.

In accordance with the illustrative embodiment, compression molding is used to form parts via in-situ "differential" melting of polymers. This involves applying compression molding techniques to a layup comprising one or more preforms, or flat form-factor feedstock, as well as one or more "differential-melt polymers," as described further below.

Compression molding applies heat and pressure to melt and/or consolidate materials in a layup and form them to the shape of a tool (mold) to create a part. In conventional compression-molding processes, the particular polymer that is used determines the heating requirement, and the shape and size of the tool determine the pressure requirement. Changing heat and pressure parameters enables a wide range of materials to be molded into components of a desirable shape.

Other "forming" processes that apply heat and pressure, such as injection molding, vacuum bagging, autoclave, vacuum bagging and autoclave, thermoforming, and over molding may be used to form parts in accordance with the present invention.

Constituents. In accordance with an illustrative embodiment of the invention, a layup used to mold/form a part includes: (i) preforms and/or flat form-factor feedstock, both of which contains (typically thousands of) fibers that are impregnated with a "matrix precursor," and (ii) one or more differential-melt polymers.

The preforms are sized or sized and shaped segments of towpreg (i.e., fiber bundles impregnated with a polymer resin). Since a preform, as that term is defined herein, is a segment of towpreg, it will typically (but not necessarily) include a single type of fiber (usually in multiples of 1000 fibers). Preforms can have any cross-sectional shape typical for fiber tow (e.g., circular, oval, trilobal, polygonal, etc.). And as suits a particular layup (based on mold configuration), the preforms can be manipulated to have any form factor (i.e., the fiber bundles can be arranged in any fashion to form any shape).

Flat form-factor feedstock includes tape, sheets of fiber, laminate plies, and like, and, like preforms, comprises fiber impregnated with polymer resin. Flat form-factor feedstock typically includes one type of fiber.

In some embodiments, a preform or flat form-factor feedstock includes more than one type of fiber. In embodiments in which a layup includes both preforms and flat form-factor feedstock, the fiber type(s) in each can be individually selected. In other words, the fiber type(s) in the preforms and the fiber type(s) in the flat form-factor feedstock in a given layup can differ from one another. In embodiments in which the layup includes both preforms and flat form-factor feedstock, the matrix precursor in both will typically, but not necessarily, be the same.

Non-limiting examples of the type of fiber included in the preforms or flat form-factor feedstock include: carbon, glass, natural fibers, aramid, boron, metal, ceramic, carbon nanotubes, flax, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Furthermore, carbon nanotubes can be used.

The individual fibers can have any diameter, which is typically, but not necessarily, in a range of 1 to 100 microns. Each individual fiber can be formed of a single material or multiple materials. Additionally, an individual fiber can comprise a core (of a first material) that is coated with a second material to impart certain characteristics, such as an electrically conductive material, an electrically insulating material, a thermally conductive material, or a thermally insulating material. Moreover, individual fibers can include an exterior coating such as, without limitation, sizing, to facilitate processing, adhesion of binder, or minimize self-adhesion of fibers.

Polymers, either the matrix precursor in the preforms/flat form-factor feedstock, or the differential-melt polymer(s), can be any suitable thermoplastic resin. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). Thermosets are not suitable for use in conjunction with embodiments of the invention.

The differential-melt polymer may have any suitable form factor, such as polygonal, cylindrical, etc. Furthermore, there can multiple, discrete instances of the same differential-melt polymer in the initial layup. It will be appreciated that, once melted, the legacy of the shape of the initial raw materials is not necessarily preserved.

The polymers (matrix precursor and differential-melt polymer(s)) used in the conjunction with the embodiments of the invention can be: (i) miscible blends, (ii) compatible immiscible blends, and (iii) incompatible immiscible blends.

Most polymers form incompatible, immiscible blends with each other. This means they remain chemically distinct, and the resulting heterogeneous blend has two glass-transition temperatures. Compatible, immiscible blends, which result from strong ionic or van der Waals forces between the polymers, create a polymer blend that is macroscopically uniform. Miscible polymers, such as (a) polyphenylene oxide (PPO) and polystyrene (PS), or (b) polyethylene terephthalate (PET) and polybutylene terephthalate (PBT), blend with each other to create a single-phase structure with only one glass-transition temperature.

For embodiments of the present invention, incompatible immiscible blends are used to create a heterogeneous, regional effect in the resulting part even at higher melt flows. Compatible immiscible blends and miscible blends will create near homogeneous structures in embodiments in which sufficient melt flow is achieved between the polymers.

It is notable that in some embodiments, the melt temperature of the matrix precursor and the (one or more) differential-melt polymers have "overlapping" melt-temperature profiles. In this context, that means that one of polymers will not combust, off-gas, or otherwise degrade before the other melts, lest a suboptimal part result. Most commercial polymers have a large melt-temperature range, thereby providing the requisite overlap and enabling use of many different combinations of polymers. On the other hand, in some embodiments, it is advantageous for one of the polymers to be burned-off, dissolved out, or otherwise deliberately removed from the final part, resulting in a matrix with a mesh-like structure.

Process. With few if any process alterations to compression molding (or other suitable molding/forming techniques), the addition of one or more differential-melt polymers to a matrix precursor in the molding tool results in both polymers entering the melt phase.

In some embodiments, based on their respective thermal properties, the matrix precursor and differential-melt polymer(s) sequentially enter the melt phase. Typically, although not necessarily, the melt sequence is inconsequential. That is, for a number of applications, it does not matter which of the matrix precursor or differential-melt polymer(s) is first to melt in terms of the performance of the final part. One exception (among others) to this is when the movement/migration of one or the other of the polymers must be controlled, for example, to limit mixing with the other polymer(s), or to create a desired shape or placement of the differential-melt polymer in the final part.

In some other embodiments, the matrix precursor and differential-melt polymer(s) enter the melt phase substantially simultaneously. In one such embodiment, each polymer reaches the melt phase during a preheat stage at low pressure, then pressure is rapidly increased to facilitate flow and mixing of the polymers. In some embodiments in which more than two polymers are present, some of the polymers are melted simultaneously, whereas others are melted sequentially.

Testing by the inventors has shown that the melt temperatures of the polymers, in conjunction with the pressure cycle, has an effect on the distribution of the polymers. In particular, if one polymer melts well before the other(s), it will readily distribute among the yet-to-melt polymer under relatively higher pressure, while remaining more localized under relatively lower pressure. Alternatively, if the melt temperatures of the polymers are similar, relatively less (re)distribution will occur as both plasticize near the same point in the process.

Moreover, locally heterogenous parts can also be achieved by manipulating the time-temperature superposition of the polymers being mixed. For example, a matrix precursor can be selected that flows readily at its melt temperature while the selected differential-melt polymer remains very viscous at its melt temperature. If the processing temperature is kept at the differential-melt polymer's melt temperature, then very little diffusion or mixing of the polymers will occur. This effectively creates pockets of the differential melt polymer within the matrix precursor.

Thus, in some embodiments, selection of a differential-melt polymer may involve consideration of its melt temperature and rheological properties, in addition to a consideration of the polymer's mechanical properties.

As a function of: (a) the thermal properties, and (b) the rheological properties of the base and differential-melt polymer(s), (c) the extent to which the polymers are compatible/incompatible and miscible/immiscible, as well as the manner (time/magnitude) in which (d) temperature and (e) pressure are applied during the molding process, compaction of a layup in accordance with the present teachings results in:

i) consolidation and complete mixing of the matrix precursor and the differential-melt polymer(s); or
ii) consolidation and limited/controlled mixing of the matrix precursor and differential-melt polymer(s); or
iii) consolidation and essentially no mixing of the matrix precursor and differential-melt polymer(s); or
iv) any combination of i), ii), or iii) in various locations within a part.

In all cases, the final part will possess properties of each polymer, but those properties may be exhibited either regionally or globally, as function of the extent of mixing per items (i) through (iii) above, and the positioning of each polymer in the layup.

FIG. 4 depicts method 400 for forming a part in accordance with the present teachings. In accordance with task S401 of method 400, the composition of the preforms/flat form-factor feedstock that will be used to form the part is specified. This involves consideration of the performance specification of the part (e.g., weight, strength, chemical resistance, etc.). Based on these performance requirements, those skilled in the art will be able to specify a fiber type (e.g., glass, carbon fiber, etc.) and a polymer resin (i.e., the matrix precursor) capable of creating a part that will satisfy at least some of the performance specifications.

Knowing the melt temperature of the matrix precursor as well as its rheological properties, and based on:
the desired extent of mixing of the differential-melt polymer with the matrix precursor as discussed above, and
the properties that are to be imparted to the part,
one or more differential-melt polymer(s) are specified, per task S402. Selection of the differential-melt polymer(s) may involve consideration of one or more of the factors (a) through (e) previously identified.

In accordance with task S403, the preforms and/or flat form-factor feedstock, and differential-melt polymer(s) are then arranged to form a layup in a molding tool, such as a compression-molding tool. In some embodiments, an assemblage of some or all of the preforms (i.e., a preform charge) are arranged in a shape that matches that of the mold, or a portion of the mold, before being placed therein. The assemblage can include flat form-factor feedstock as well. In task S404, pressure and temperature are appropriately ramped (time/magnitude) to achieve sequential or simultaneous melting, and global or minimal migration of the melt phase.

Once all constituents have reached the melt phase, heat is removed from the tool and the constituents solidify, per task S405. The solidified contents maintain the shape of the tool cavity once ejected, and possess a hybrid, internal polymer matrix surrounding the fibers.

As previously discussed, based on thermal and rheological properties of the polymers, layup specifics, and the manner in which temperature and pressure are applied, method 400 can result in a homogenous part with homogeneous properties, wherein the part's matrix is a homogenous mix of the matrix precursor and differential-melt polymer(s). Or, method 400 can produce a heterogeneous part, wherein the mixing of polymers is localized or otherwise restricted, resulting in localized properties. Within a given part, one or more regions may be a mix of the matrix precursor and a differential-melt polymer, one or more other regions may contain the matrix precursor but not the differential-melt polymer, and yet one or more other regions may contain the differential-melt polymer but not the matrix precursor. Moreover, the use of more than one differential-melt polymer creates the possibility for further differentiated regions with resulting tailored properties.

FIG. 1 depicts a side cross-sectional view of exemplary layup 100 in accordance with the present teachings. Layup 100 comprises (i) preforms 104, each of which contains fibers impregnated with a matrix precursor, and (ii) differential-melt polymer 106. Layup 100 is arranged within a compression-molding tool (not depicted). The shape of layup 100 is dictated by the shape of the molding tool, which in this example has a very basic rectangular shape. It is to be appreciated that the methods described herein and parts molded in accordance therewith can be formed in molding tools having far more complex geometries.

The application of heat and pressure causes layup 100 to transition to a state depicted in FIG. 2. In the embodiment depicted, differential-melt polymer 106 has a melt temperature that is lower than that of matrix precursor of preforms 104. Consequently, differential-melt polymer 106 melts before the matrix precursor as the applied heat increases the temperature within the molding tool. Once differential-melt polymer 106 reaches its melt phase, the applied pressure causes it to flow around preforms 104, which in this example have not yet melted. The result of that is depicted in FIG. 2, wherein preforms 104 are disposed within flowed differential-melt polymer 208. The decrease in height of the cross section from height H1 (FIG. 1) to height H2 represents the partial consolidation of the materials via applied pressure.

Continued application of heat and pressure to specified maximums results in the state depicted in FIG. 3, wherein the constituents are fully consolidated to a final shape. As depicted, the height of the cross section further decreases from height H2 (FIG. 2) to height H3. The matrix precursor of preforms 104 has now melted, mixing within the flowed differential-melt polymer 208, forming polymer mix 310. The melted polymers have adopted the shape of the molding tool. Fibers, which are present in polymer mix 310, are not depicted.

In the example depicted in FIGS. 1-3, the result is a homogenous part having globally uniform properties that are characteristic of the properties of each polymer.

Beyond the aforementioned considerations, the performance of a final part made in accordance with the present teachings is based on several additional factors. One such factor is the initial placement of the differential-melt polymer in one or more specified locations within the layup. Furthermore, testing has revealed that the form factor of the differential-melt polymer is another factor of importance. For example, a given volume of polymer in a cube shape will have a different effect on the final part than the same volume of the same polymer, but in the form of a flat sheet. Among any other reasons for this is that the cube form factor places relatively more of the polymer proximal to a desired location than the flat form factor.

In various embodiments, the present invention can be used to form a part that includes, without limitation:
 one matrix precursor and one differential-melt polymer;
 one matrix precursor and two or more differential-melt polymers;
 two or more matrix precursors (such as via the use of two or more different types of preforms/flat form-factor feedstock) and one differential-melt polymer; and
 two or more matrix precursors and two or more differential-melt polymers.

In many applications of the present invention, the differential-melt polymer will be an elastomer. The elastomer and the matrix precursor are distinguishable based on their elastomeric properties, which may be characterized in terms of elongation. In particular, as defined for use herein and the appended claims, the term "elastomer" refers to a thermoplastic polymer having an amount of elongation that is at least 10 times greater than that of the matrix precursor.

FIGS. 5A through 5D depict the fabrication of a homogenous part in accordance with an embodiment of the invention. For this embodiment, the molding constituents include preforms 520 comprising carbon fiber impregnated with nylon (PA6), and a hard, thermoplastic polyurethane (TPU) (an elastomer) as differential-melt polymer 522. The TPU melts before the nylon (matrix precursor).

Figure 5A:
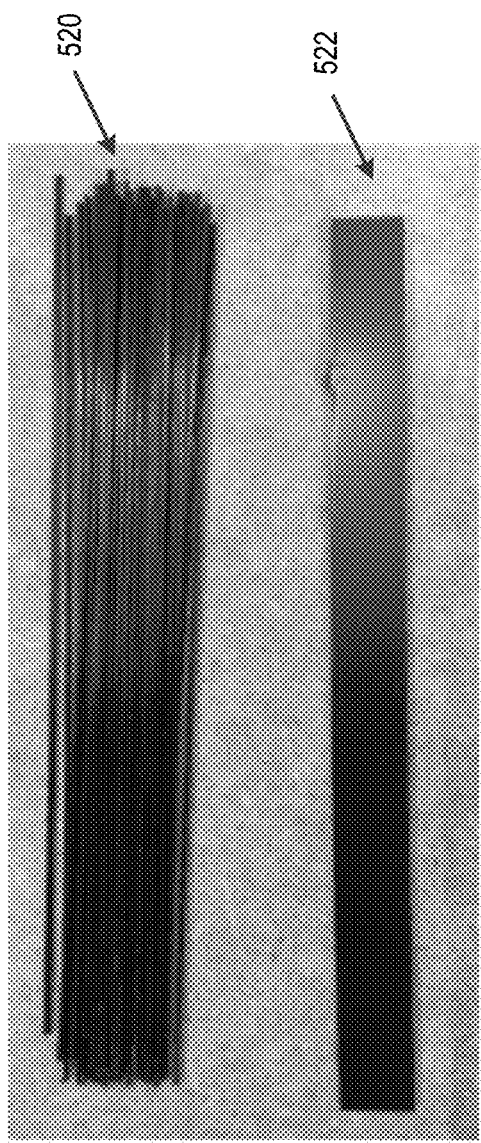
FIG. 5A depicts a photo illustration of preforms and differential-melt polymer before being placed in a compression-molding tool.

FIG. 5A depicts preforms 520 and differential-melt polymer 522 prior to being placed in a compression-molding tool. The volume fraction of differential-melt polymer 522 was chosen to be about ten percent of the total volume of the final part. The volume of differential-melt polymer 522 can be regarded as the independent variable, with the change in performance of a given property of the part being the dependent variable.

Figure 5B:
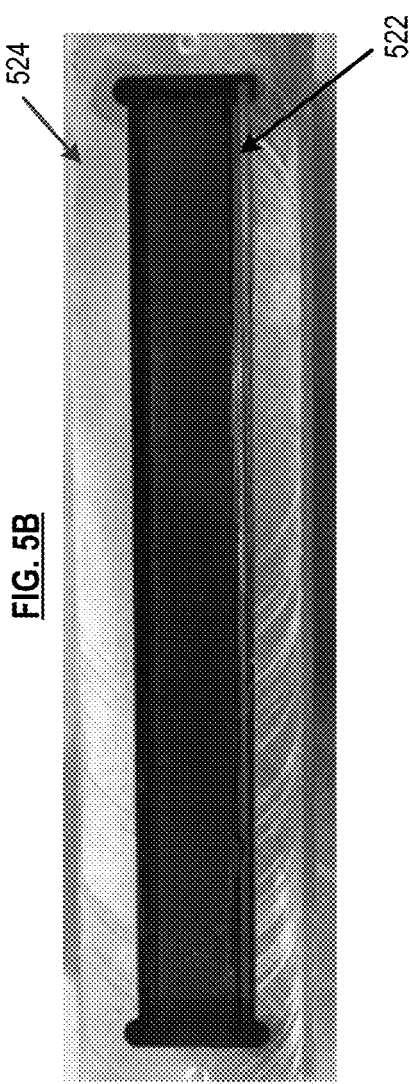
FIG. 5B depicts a photo illustration of the differential-melt polymer of FIG. 5A situated on top of a layer (not visible) of the preforms of FIG. 5A, in a compression-molding tool.
Figure 5C:
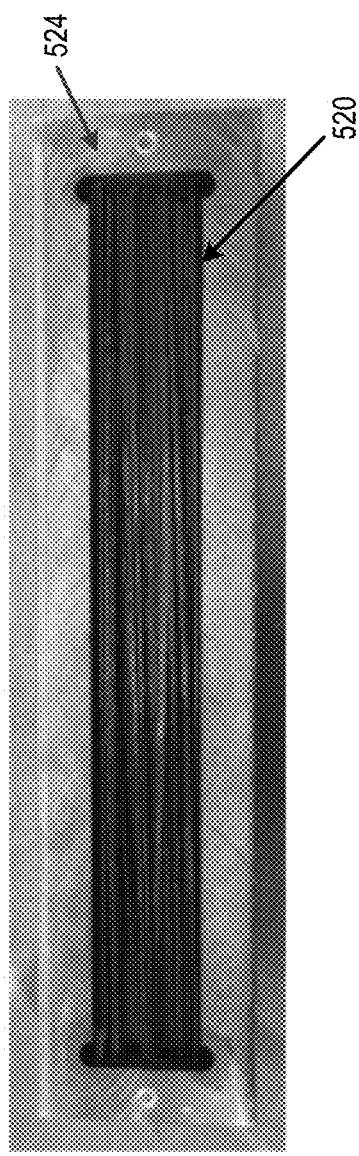
FIG. 5C depicts a photo illustration of the final layup of the preforms and differential-melt polymer of FIG. 5A in the compression molding tool of FIG. 5B, wherein half of preforms are located below the differential-melt polymer and the other half are located above it.

FIG. 5B depicts a nascent layup, wherein differential-melt polymer 522 is situated on top of a layer of preforms 520 (not visible) in molding tool 524. FIG. 5C depicts the final layup, with half of preforms 520 below differential-melt polymer 522 and the other half of the preforms above it.

Figure 5D:
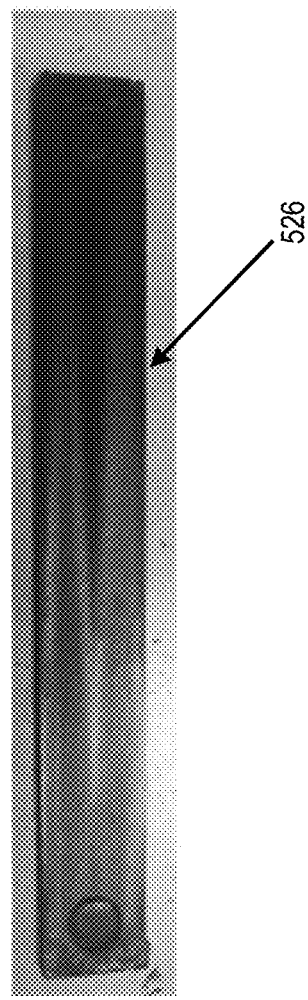
FIG. 5D depicts a photo illustration of the part produced via the application of heat and pressure to the layup depicted in FIG. 5C.

Heat and pressure are applied to the final layup, resulting in part 526, as depicted in FIG. 5D. Qualitative results confirm improved damping and elastic properties of this part relative to a part produced in the same tool using only preforms 520. This resulted from a global, homogeneous dispersion of differential-melt polymer 522 via in-situ processing.

Constrained Elastomer Layer. FIG. 6A depicts part 628, which includes constrained elastomer layer 630 in the relatively larger square region of the part. This is an example of a heterogeneous part formed in accordance with the present teachings.

FIG. 6B depicts layup 642, which can be used to form part 628, in accordance with the present teachings. Layup 642 is shown within molding tool 632. The molding tool includes relatively larger square region 638, and relatively smaller rectangular region 640.

Layup 642 is a combination of (i) preforms 644, 646, 648, each type characterized by a different length but having the same composition, (ii) differential-melt polymer 650, present as three rectangular portions, and (iii) flat form-factor feedstock, embodied as plies 652A and 652B. In this example, plies 652A and 652B include the same fibers, and, notably, the same polymer as preforms 644, 646, and 648.

Layup 642 includes, at bottom, a row of long preforms 644. These preforms are approximately equal in length to wall 634 of molding tool 632, which is the longest dimension of the molding tool. On top of this bottom row long preforms is a row of preforms 646. These preforms are approximately equal in length to wall 635 of relatively smaller rectangular region 640.

On top of the bottom row of preforms 646, but within relatively larger square region 638, is ply 652A. This ply has dimensions approximately equal to that of the relatively larger square region. On top of ply 652A are three rectangular portions of differential melt polymer 650. Collectively, the area of these three rectangular portions is approximately equal to that of ply 652A. Ply 652B is disposed on top of the three portions of differential-melt polymer 650. Ply 652B has the same dimensions as ply 652A. In this fashion, the two plies sandwich and "constrain" the portions of differential-melt polymer 650. During compression molding of layup 642, these three layers (the two plies and the differential-melt polymer) will function to create constrained elastomer layer 630 of the final part 628.

An additional row of preforms 646 is disposed on the row of preforms 646 already positioned in region 640. In this particular illustration, these two rows of preforms 646 are approximately equal in height to the two plies 652A and 652B and the differential-melt polymer 650. Next, a row of long preforms 644 are situated on top of the uppermost row of preforms 646 and ply 652B. (For clarity, only one of preforms 644 from this row is depicted.) A row of preforms 648, each of which preforms being approximately equal in length to wall 636 of the region 638, is placed on top of ply 652 towards the "back" of region 638. (For clarity, only one of preforms 648 from this row is depicted.)

Applying the approaches previously described for creating heterogenous parts, and subjecting layup 642 to compression molding (or other molding/forming processes), the melt flow of the matrix precursor (i.e., sourced from the preforms and the plies) is restricted such that minimal intermixing of that polymer with differential-melt polymer 650 occurs. As a result, constrained elastomer layer 630 (FIG. 6A) is formed.

In some other embodiments, plies 652A and 652B include only fiber—no polymer. In yet some further embodiments, the plies include a polymer that is different from either the matrix precursor or differential-melt polymer 650. In other words, a second differential-melt polymer 650 is contained in plies 652A and 652B. Embodiments that introduced a second differential-melt polymer may complicate or otherwise limit the choice of suitable polymers.

With respect to constrained elastomer layers, testing by the inventors have validated certain generally accepted behaviors, such as the effect of varying the volumetric ratio of elastomer in the layup. In particular, testing confirmed that as the volume of elastomer in the layup increases, part stiffness decreases—but only to a degree. At some point, which is characteristic of the particular system (i.e., the specific matrix precursor/elastomer), part damping performance plateaus and part stiffness plateaus. In other words, above a threshold volume of elastomer, increases in the elastomer volumetric ratio in the layup provide only negligible increases in damping performance and negligible decreases in stiffness. Additionally, the inventors have discovered that:
 increasing the length of a viscoelastic layer in a part increases damping performance;
 the relative location of a viscoelastic layer in a layup effects damping performance.

Sink Marks.

Sink marks are a common problem in compression and injected-molded parts. Sink marks manifest as slight depressions resembling "dimples" on the surface of a planar portion of a part. The use of a differential-melt polymer, in accordance with the present teachings, provides a way to prevent or reduce the size and occurrence of sink marks.

Sink marks usually appear near to local features of a part that introduce a geometry that differs from the surrounding volumetric regions. Their presence is typically seen in parts possessing thin, planar regions, specifically those having protruding geometry on one side of the surface of the part. The sink marks appear on the side of the part opposite the protruding feature.

Sink marks are attributable to localized shrinkage of a molded part within the internal volumetric region between such flat surfaces and protruding features. This shrinkage is associated with the feature protruding from the opposite surface. By introducing a significant change in the part's cross section, the protruding features can disrupt the homogenous consolidation dynamics of material in bordering thin, planar regions. The defining feature of sink marks—surface depressions—result from the locally heterogeneous consolidation dynamics of material into these features during molding, specifically as the material is cooling.

Figure 7A:
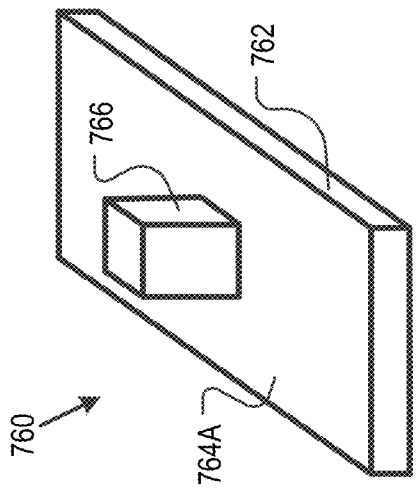
FIGS. 7A through 7C depict an example in the prior art of a molded part that is subject to sink marks.
Figure 7B:
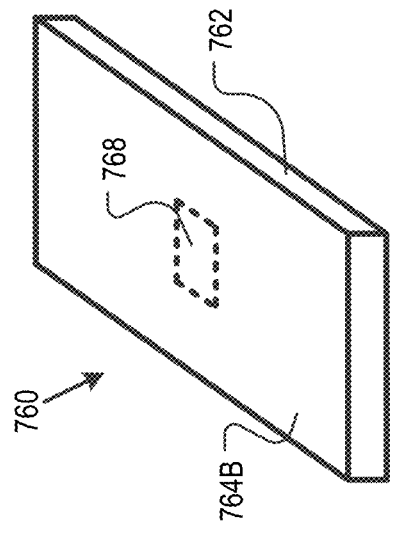
Figure 7C:
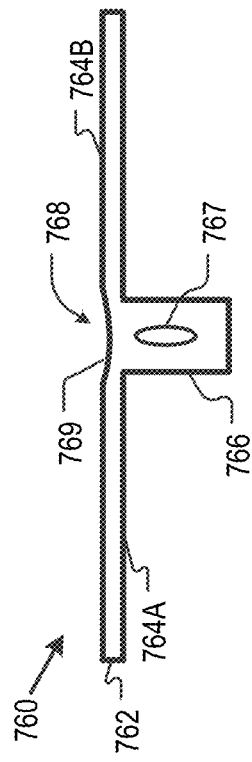

FIGS. 7A through 7C depict an example in the prior art of molded part 760 that is subject to sink marks. This part includes base 762, which has a thin, flat, rectangular form of constant cross section, and protruding boss 766. The boss is situated on surface 764A of base 762. Sink marks 769 are likely to appear in region 768 of surface 764B, which is the surface on the opposite side of base 762 from boss 766. Region 768 is located directly opposite the location of boss 766. Sink mark 769 (FIG. 7C) is due to the volumetric shrinkage that occurs in region 767.

Since they are considered undesirable in molded parts, the prevention and troubleshooting of sink marks is broadly practiced. Prior-art methods for addressing sink marks involve specifying part geometry or tuning processing parameters.

For example, during the design phase of a molded part, the maximum height of a protruding feature is determined by the thickness of the bordering planar region (i.e., thinner sheets will exhibit sink marks opposite deeper features). A processing example is to decrease the cooling rate of the material during molding so as to reduce internal temperature gradients (i.e., material between the protruding feature and the opposite surface will solidify simultaneously with the surroundings as opposed to cooling differentially, and then thermally contracting relative to each other).

Typical approaches to troubleshooting include increasing the mass/volume of the materials in the mold, increasing the temperature of the mold/material, increasing mold closing speed, increasing cooling time, cleaning mold vents, optimizing the ratio of rib/boss depth to sheet thickness, and optimizing runner and gate layout and sequence.

Certain molded parts, however, are constrained in terms of both geometry and processing. That is, neither the dimensions nor the manufacturing techniques associated with the part are alterable. In such cases, the prior art does not possess a method for preventing sink marks.

In accordance with the illustrative embodiment, an appropriate elastomer, as a differential-melt polymer, is introduced into the mold for a part along with other molding materials, typically preforms, to prevent or reduce the size and occurrence of sink marks.

The matrix precursor (from preforms/flat form-factor feedstock) and the elastomer are introduced into a mold, wherein the elastomer is sited proximal to where a protruding feature will be formed. The mold is then closed, and temperature and pressure are applied. As the molding process progresses, both the elastomer and the matrix precursor are melted and consolidated (with fibers if present). Once full melt and consolidation are accomplished, the process continues to a cooling phase.

In accordance with the present teachings, the selected elastomer melts at a lower temperature than the matrix precursor. Due to their differential melt temperatures, the matrix precursor will solidify prior to the elastomer during the cooling phase. This primary solidification yields a local volumetric region—a cavity—between the protruding feature and the opposite surface. The cavity contains the still-liquid elastomer for the remainder of the cooling process. As the cooling continues to lower temperatures, the elastomer will subsequently solidify within the region that has constrained its volume.

Although elastomers will readily deform under pressure, they will not do so when thoroughly constrained. In fact, their Poisson's ratio is higher than most metals, which renders them highly incompressible in such constrained scenarios. An elastomer that is entirely constrained in all directions, as results from this embodiment, can withstand immense compressive force.

So, in accordance with the process, a local region having increased incompressibility therefore results. The resultant incompressibility in this region prevents or substantially reduces the shrinkage that would otherwise cause the sink marks. The stress introduced by heterogeneous thermal shrinkage within a part is still present, but because of the elastomer's incompressibility (as constrained), it resists deformation, such that sink marks are greatly reduced or eliminated. Thus, it is the incompressibility of the constrained elastomer, near to the protruding feature, that is ultimately responsible for preventing sink marks in accordance the present method.

Sink marks only occur for certain geometries, and it is to parts with such geometries that the present teachings apply. Namely, parts with thin contoured or planar regions, defined by very high aspect ratios, having features protruding from one side's surface area but not from the corresponding area on the opposite surface. The cooling of the opposite surface relative to the protruding feature causes sink marks.

For embodiments directed to the amelioration of sink marks, the resulting part will be heterogenous. That is, it will have a localized volume of a material—elastomer—that is different from the material (the matrix) comprising the rest of the volume of the part. Incompatible immiscible blends of elastomer and matrix precursor are used to create such heterogeneity, even at higher melt flows.

As previously mentioned, the requisite localized heterogeneity can be achieved even with compatible immiscible blends and miscible blends, as long as the selected polymers remain relatively viscous at their melt temperature, even after entering the melt phase. Such polymer will tend to maintain their location in a mold.

In such embodiments, it is advantageous for the melt temperatures to be close to one another, so that the melt flow of the lower-melting-temperature polymer—which will be the elastomer—does not increase dramatically when its temperature is raised to the melting point of the high-melting-temperature polymer. Provided that is case, very little diffusion or mixing of the polymers will occur, such that a pocket of elastomer can be established and maintained in the molded part. If, however, the melt flow of the elastomer is substantially at or near the melting point of the matrix precursor, the elastomer will be able to flow through the preforms (since the resin therein has not yet melted), and distribute throughout the part.

Typically, but not necessarily, the melt and degradation temperatures of the elastomer will be similar to that of the matrix precursor. Solid thermoplastic elastomer having any form factor (e.g., film, pellets, filament, etc.) may suitably be used in conjunction with these embodiments. Elastomers suitable for use in reducing sink marks in accordance with the present teachings include any thermoplastic elastomers, including, without limitation, TPE, TPU, TPS, TPA, TPO. Acceptable matrix precursors include any having a melt temperature that is below the degradation temperature of the elastomer with which it is used. Suitable matrix precursors may include, without limitation, PA6, PA66, PA12, PC, PEI, and PE. If fibers are present, they can be any type, as previously discussed.

The amount of elastomer that is placed proximal to the portion of the mold that forms the protruding feature is dependent on the volume of that feature. Based on experimental observations of sink-mark reduction in accordance with the present teachings, an amount of elastomer in the range of about 5 to 40 volume percent of the feature may suitably be used. The remainder of the volume is the matrix precursor, with or without fiber.

Due to the inherent decrease in molded-part stiffness resulting from the addition of the elastomer, a volume of elastomer within the aforementioned range can be specified based on application specifics. A part that requires an aesthetic (very smooth) surface, for example, and that is otherwise subject to sink marks, will benefit from using an amount of elastomer towards the higher end of the aforementioned range (i.e., relatively closer to 40 than 5). For a part in which the surface aesthetic is of minor concern, an amount of elastomer towards the lower end of the aforementioned range (i.e., relatively closer to 5 than 40), can be used. In light of the present teachings, those skilled in the art will be able to specify, such as by simple experimentation, a specific amount of elastomer within the aforementioned range that suits a particular application for a part.

The flow diagram depicted in FIG. 4 is applicable for embodiments directed towards sink mark reduction.

In particular, in the layup formed in task S403, the elastomer is positioned in the mold near to a region that will form a protruding feature. Typically, the elastomer will have a lower melt temperature than the matrix precursor, such that the elastomer melts before the matrix precursor and solidifies after it. Thus, with respect to tasks S404 and S405, in terms of temperature/pressure sequencing, the molding tool is cooled while pressure is maintained. Due to the differential melt temperatures of the polymers, the matrix precursor will solidify to form a "matrix" prior to the elastomer. This primary solidification entraps the liquid region of elastomer for the remainder of the cooling process. It is important to maintain pressure to ensure that the elastomer is constrained during cooling. As the cooling continues to lower temperatures, the elastomer will subsequently solidify, entrapped and constrained within the surrounding matrix.

So trapped and constrained, the elastomer cannot deform under pressure, and thus becomes highly incompressible. Between the composite solidification temperature and the ejection temperature at which the part is removed from the mold, the coefficient of thermal expansion (CTE) of the metal mold and the CTE of the matrix exert significant thermal stress on the elastomer volume. Due to the incompressibility of the constrained elastomer, the sink marks that would otherwise result from such thermal shrinkage are prevented or mitigated.

Figure 8:
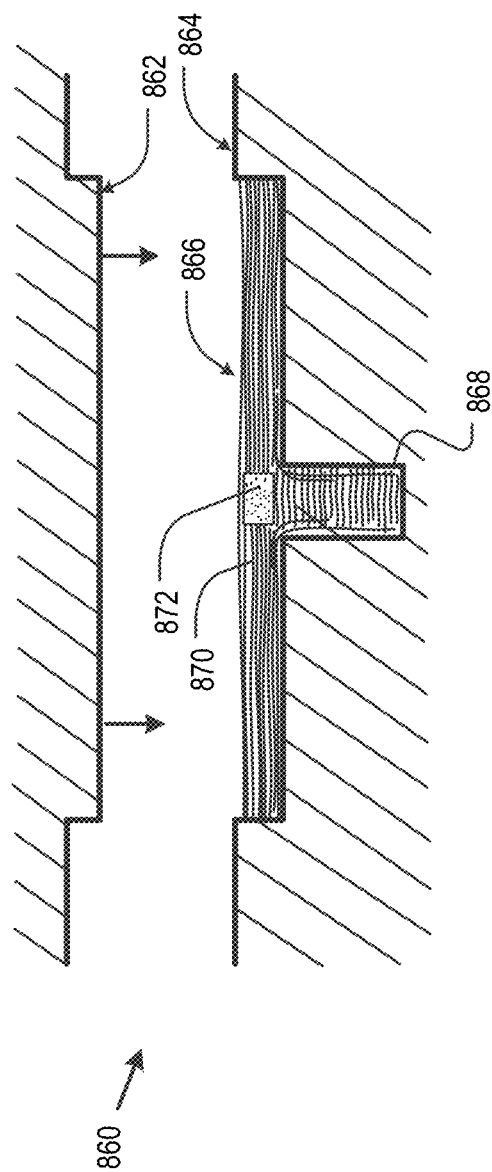
FIG. 8 depicts a layup and method in accordance with the illustrative embodiment of the present invention for molding a part having the same geometry of the part depicted in FIGS. 7A through 7C.

FIG. 8 depicts a layup and method in accordance with the present teachings for molding a part having the geometry of part 760 depicted in FIGS. 7A through 7C. FIG. 8 depicts mold 860, which includes male mold portion 862, and female mold portion 864 including mold cavity 866. The mold cavity includes region 868 for forming the boss. Preforms 870 of various shapes and sizes, and a volume of elastomer 872, are appropriately situated in mold cavity 866. The elastomer is sited between the region 868 and what will be a surface (the surface opposite to the surface bearing the boss) of the part.

As previously discussed, in the illustrative embodiment, as heat is applied to the mold and the temperature rises, the elastomer will melt and then the matrix precursor will melt. As long as the elastomer has a relatively low melt flow (i.e., is relatively viscous) at the prevailing temperatures, the elastomer will remain in its original location in the mold. Once the cooling phase begins, the matrix precursor will solidify first, trapping the still-liquid elastomer in a discrete volumetric region.

Figure 9:
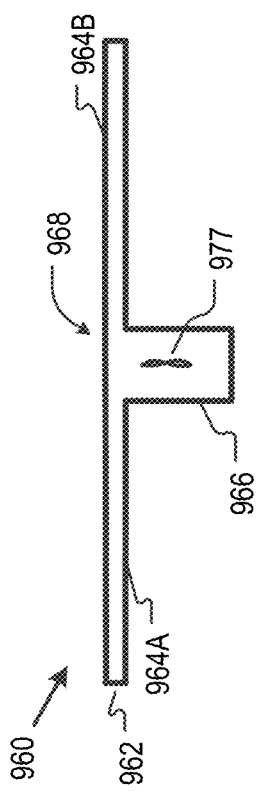
FIG. 9 depicts a cross-sectional view of a part formed from the layup of FIG. 8 and in accordance with the present teachings, wherein the part does not exhibit any sink marks

FIG. 9 depicts a cross-sectional view of molded part 960 molded from the layup depicted in FIG. 8. This part has the same geometry as that of part 760 of FIGS. 7A-7C, but made in accordance with the present teachings.

Part 960 includes base 962 and boss 966 on surface 964A, but molded in accorded with the present invention. Unlike part 760, no sink marks appear in region 968 on surface 964B due to the increased compressibility in volumetric region 978 (compare to FIG. 7C).

FIGS. 10A and 10B depict another example of a molded part in the prior art that is subject to sink marks. Part 1080 includes thin planar base 1082 and ribs 1084 protruding from surface 1086A of the base. Ribs 1084 have a height that is more than an order of magnitude greater than the thickness of base 1082. As depicted in FIG. 10B, sink marks will thus occur in region 1088 on surface 1086B, opposite to the location of ribs 1084 on surface 1086A.

Applying the present teachings to such a geometry, elastomer and preforms/preform charge are placed in a suitably configured mold wherein the elastomer is sited proximal to the portion of the mold cavity where the ribs are formed. As previously described, as the elastomer solidifies in this position during cooling, it will increase the incompressibility of the region between ribs 1084 and surface 1086B, thus reducing or preventing the sink marks that would otherwise occur at region 1088.

FIGS. 11A and 11B depict a further example of prior-art mold part that is subject to sink marks. FIG. 11A depicts part 1190 having contoured panel 1192 with stiffening ribs 1194 and attachment features 1196 protruding from surface 1198A. FIG. 11B depicts surface 1198B of panel 1190, showing locations 1195 and 1197 at which sinks marks will appear. These locations correspond to the respective locations of stiffening ribs 1194 and attachment features 1196 on the opposite surface of panel 1190.

Applying the present teachings to such a geometry, elastomer, as the differential-melt polymer and preforms/preform charge are placed in a suitably configured mold wherein the elastomer is sited proximal to the portion of the mold cavity where ribs 1194 are formed. As previously described, as the elastomer solidifies in this position during cooling, it will increase the incompressibility of the region between ribs 1194 and surface 1198B, thus reducing or preventing the sink marks that would otherwise occur at region 1195. Similarly, elastomer is sited proximal to the portion of the mold cavity were attachment features 1196 are formed. As the elastomer solidifies in this position during cooling, it will increase the incompressibility of the region between attachment features 1196 and surface 1198B, thus reducing or preventing the sink marks that would otherwise occur at region 1197.

It is to be understood that the disclosure describes a few embodiments and that many variations of the invention can easily be devised by those skilled in the art after reading this disclosure and that the scope of the present invention is to be determined by the following claims.

What is claimed:

1. A method for molding an article from two or more thermoplastic polymers, the method comprising:
    forming a layup, wherein the layup includes:
        (a) a plurality of fibers and a matrix precursor, wherein the matrix precursor is a first of the two or more thermoplastic polymers, wherein a first portion of the plurality of fibers are configured as a first ply having a first shape with first dimensions of length and width, and a second portion of the plurality of fibers are configured as a second ply having the first shape with the first dimensions, and
        (b) a differential-melt polymer, wherein the differential-melt polymer is a second of the two or more thermoplastic polymers, wherein the differential-melt polymer is an elastomer,
        (c) a first region, wherein the first region consists of the first ply, the second ply, and at least a first portion of the differential-melt polymer, which is disposed therebetween;
    wherein the matrix precursor and the differential-melt polymer differ as to at least one property selected from the group consisting of thermal properties and rheological properties;
    subjecting the layup to heat and pressure to melt the matrix precursor and the differential-melt polymer; and
    cooling the melted matrix precursor and melted differential-melt polymer to form the article, the article including a constrained elastomeric layer.

2. The method of claim 1 wherein subjecting the layup to heat and pressure further comprises controlling the application of at least one of temperature and pressure to result in no mixing of the matrix precursor and differential-melt polymer.

3. The method of claim 1 wherein the first ply includes a first portion of the matrix precursor, and the second ply includes a second portion of the matrix precursor.

4. The method of claim 1 wherein the first ply includes a second portion of the differential melt polymer and the second ply includes a third portion of the differential melt polymer.

5. The method of claim 4 wherein a melt temperature of the elastomer is less than a melt temperature of the matrix precursor.

6. The method of claim 1 wherein the layup comprises a preform charge.

7. The method of claim 1 wherein the first portion of the differential melt polymer occupies an area in the layup substantially equal to an area occupied by the first ply and the second ply, individually, based on the first dimensions thereof.

8. A method for molding, via compression molding, an article from two or more thermoplastic polymers, the article having a geometry characterized by a region wherein a first side of the article has a flat surface and an opposite side of the article has a protruding feature, the method comprising:
    forming a layup from which the article is molded, wherein a shape of the layup is substantially the same as the shape of article, and wherein the layup includes:
        a) a matrix precursor, wherein the matrix precursor is a first of the two or more thermoplastic polymer and has a first melt temperature, and
        b) an elastomer, wherein the elastomer is a second of the two or more thermoplastic polymers and has a second melt temperature, wherein the second melt temperature is lower than the first melt temperature, and
    wherein, in the layup, the elastomer is sited proximal to a location at which the protruding feature will be formed;
    sequentially melting the elastomer and the matrix precursor by subjecting the layup to heat and pressure in a mold; and
    reducing temperature below the first temperature, thereby solidifying the matrix precursor to a matrix and forming a region that contains the melted elastomer;
    reducing temperature to below the second temperature, thereby solidifying the elastomer within the region, resulting in a part having a region that substantially resists deformation.

9. The method of claim 8 wherein forming a layup further comprises providing an amount of elastomer in a range of about 5 to about 40 volume percent of a volume of the feature.

10. The method of claim 8 wherein forming a layup further comprises providing fiber.

11. The method of claim 8 wherein the layup comprises a preform charge.

* * * * *